United States Patent
Kummamuru et al.

(10) Patent No.: US 11,328,005 B2
(45) Date of Patent: May 10, 2022

(54) MACHINE LEARNING (ML) BASED EXPANSION OF A DATA SET

(71) Applicant: ACCENTURE GLOBAL SOLUTIONS LIMITED, Dublin (IE)

(72) Inventors: Krishna Kummamuru, Bangalore (IN); Arjun Atreya V, Bangalore (IN); Bibudh Lahiri, Noida (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 801 days.

(21) Appl. No.: 16/204,780

(22) Filed: Nov. 29, 2018

(65) Prior Publication Data

US 2020/0110769 A1    Apr. 9, 2020

(30) Foreign Application Priority Data

Oct. 5, 2018    (IN) .............................. 201811037760

(51) Int. Cl.
  *G06F 16/33*    (2019.01)
  *G06F 16/35*    (2019.01)
  (Continued)

(52) U.S. Cl.
  CPC .......... *G06F 16/3334* (2019.01); *G06F 16/35* (2019.01); *G06F 16/953* (2019.01); *G06F 40/295* (2020.01); *G06N 20/00* (2019.01)

(58) Field of Classification Search
  CPC ........ G06F 16/33; G06F 16/35; G06F 16/953; G06F 40/295
  See application file for complete search history.

(56) References Cited

U.S. PATENT DOCUMENTS 8,429,164 B1    4/2013    Tong et al.
8,856,099 B1   10/2014    Lasko et al.
(Continued)

FOREIGN PATENT DOCUMENTS

WO    2006/078794 A2    7/2006
WO    2018/033779 A1    2/2018

OTHER PUBLICATIONS

Suplari, "The Insights Platform for Procurement", retrieved from the Internet on Feb. 4, 2019, 5 pages. <https://suplari.com/>.

*Primary Examiner* — Tarek Chbouki
*Assistant Examiner* — Maher N Algibhah
(74) *Attorney, Agent, or Firm* — Mannava & Kang, P.C.

(57) ABSTRACT

A machine learning (ML) based automated search system receives an entity information document including a plurality of entities and identifies new entities that are similar to the plurality of entities which are not included in the entity information document via automated searches. Entity intelligence reports are generated for the plurality of entities which are further used to extract search terms. The search terms are used for executing automatic searches for documents with relevant portions. The documents are further analyzed to identify other, new entities which are not included in the entity information document. Entity intelligence reports including information regarding the new entities are also generated. Significant attributes are determined for the entities. The significant attributes are further employed in ranking the new entities so that top ranked new entities are identified. Alerts can be generated based on the information regarding the new entities.

19 Claims, 10 Drawing Sheets

(51) Int. Cl.
    *G06F 16/953*    (2019.01)
    *G06N 20/00*    (2019.01)
    *G06F 40/295*    (2020.01)

(56) References Cited

U.S. PATENT DOCUMENTS

| | | |
|---|---|---|
| 9,639,874 B2 | 5/2017 | Psota et al. |
| 9,665,641 B1 * | 5/2017 | Zhang .................. G06F 16/285 |
| 2013/0275269 A1 | 10/2013 | Chen et al. |
| 2017/0293850 A1 | 10/2017 | Shawla et al. |
| 2018/0197001 A1 * | 7/2018 | Bender .............. G06K 9/00483 |
| 2018/0232421 A1 * | 8/2018 | Dialani .................. H04L 67/42 |
| 2019/0332620 A1 * | 10/2019 | Wason ................... G06N 5/022 |
| 2021/0026897 A1 * | 1/2021 | Rathje ................ G06F 16/3344 |
| 2021/0117417 A1 * | 4/2021 | Hendrickson ....... G06F 16/2465 |

* cited by examiner

MACHINE LEARNING (ML) BASED EXPANSION OF A DATA SET

PRIORITY

The present application claims priority under 35 U.S.C. 119(a)-(d) to the Indian Non-Provisional Patent Application Serial No. 201811037760, having a filing date of Oct. 5, 2018, the disclosure of which is hereby incorporated by reference in its entirety.

BACKGROUND

Modern day search engines enable user access to a large quantum of information. A user may enter a web search query to satisfy an information need. Web search queries are distinctive as they are generally issued in natural languages. A web search is therefore as good as the searcher issuing the web search query in that the web search relies on the searcher's knowledge of the domain of search and the web search query framed by the searcher. Various types of search queries such as but not limited to, informational queries, navigational queries etc. can be employed by users to retrieve data from a search engine. Some search engines may provide for caching of prior queries and/or the search results for subsequent searches. However, the user may still need to review the search results to discover if the search results include the required data. If the search results do not include the required data, the user may have to issue a different web search query.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A machine-learning (ML) based automated search system disclosed herein receives an entity information document having data entries related to a plurality of entities of a target category, executes automatic searches based on the plurality of entities and identifies new entities that are similar to the plurality of entities. A target category can pertain to one of the various categories of products and services that are available across domains. Each entity in a target category can pertain to a particular source of product or service such as a manufacturer or a provider of a service. The entity information document can include entity identification data such as name of the entities which enable the automated search system to gather data regarding the entities that enables further discovery of the new entities within public and private data sources. The entity information document can include documents of various formats. Based on the format of the document, one or more of textual processing, natural language processing (NLP) techniques or other ML-based image analysis techniques can be adopted to recognize the entities in the entity information document.

The entities thus recognized can be used for gathering further information from a plurality of data sources. For example, internal and external data sources such as websites associated with the entities are crawled to gather the further information. If the further information pertaining to an entity is obtained from multiple sources such as different websites, then such information can be stored in an unstructured or structured format within a data store. The further information thus gathered can be used to construct a respective entity intelligence report. The entity intelligence report of a particular entity can include but is not limited to, address, description, headquarters, financials etc. In an example, the fields or metadata regarding an entity to be included in an entity intelligence report can be predefined for a particular target category.

The entity intelligence reports of the plurality of entities are analyzed again using one or more of textual processing and NLP techniques to automatically identify search terms. The search terms thus gathered are used to automatically execute searches on general purpose search engines. In an example, the custom search application programming interfaces (APIs) extended by the general search engines can be employed to programmatically trigger the web search. The results from the searches are crawled and the relevant portions of the documents such as specific textual portions are extracted to build a corpus. The contents of the corpus are further analyzed based on content and structural aspects for identifying or discovering a set of new entities. Co-occurrence of other entities along with one or more of the plurality of entities in the textual portions of the documents in the corpus can be used to identify the new entities in an example. Co-occurrences can include which can include consecutive occurrences or intermittent occurrences interspersed with other text. In another example, the information structures or formats such as lists in textual documents or in hypertext markup language (HTML) documents can be used to identify the new entities. In an example, the new entities can include additional entities which are relevant to the target category and identified via the automatic searches but which are not included in the entity information document. The new entities in the set of new entities are again used as search terms on external data sources such as general purpose search engines for gathering data regarding the new entities. Entity intelligence reports corresponding to each entity of the set of new entities are also constructed using the data gathered from the relevant results produced by the external data sources. The entity intelligence reports of the plurality of entities and the new entities in the set of new entities are analyzed to identify significant attributes. Significant attributes include attributes or metadata of the entities which bear high degree of similarity with each other. Various similarity measures such as but not limited to, cosine similarity or Gini index can be used to determine similarities between the entity attributes. Each entity of the set of new entities can be ranked based on similarity of the new entity attributes with the attributes or metadata of the plurality of entities. A ranked list of top x new entities (x being a natural number and x=1, 2 . . . ) can be output by the automated search system. Multiple attributes can be used together to rank the entities. The attributes can be assigned weights which would depend on how much the attribute varies across all the entities. An attribute that has large variation across the entities can be given a low weight as such attribute does not indicate any commonality across the entities. An alert generator can be further employed to generate and transmit alerts to registered users regarding the new entities that were discovered during the automated searches disclosed herein.

The automated search system as disclosed herein provides for the technical advantages associated with NLP-based discovery of search terms and automatically executing searches using the search terms. The automatic execution of searches and selection of search results to generate the new entities addresses the variability associated with manual execution of the processes. This is because the output of the manual discover of search terms and selection of search results depends on the efficiency of analysis in terms of the comprehensiveness of the analysts' searches which can lead to suboptimal set of entities. The automated search system disclosed herein harnesses advanced AI techniques to explore the whole of the web for information regarding the entities. Moreover, advanced NLP techniques are used to extract the attribute information which enables to speed up search systems for discovering new entities while increasing the accuracy in the ranking of the entities.

Figure 1:
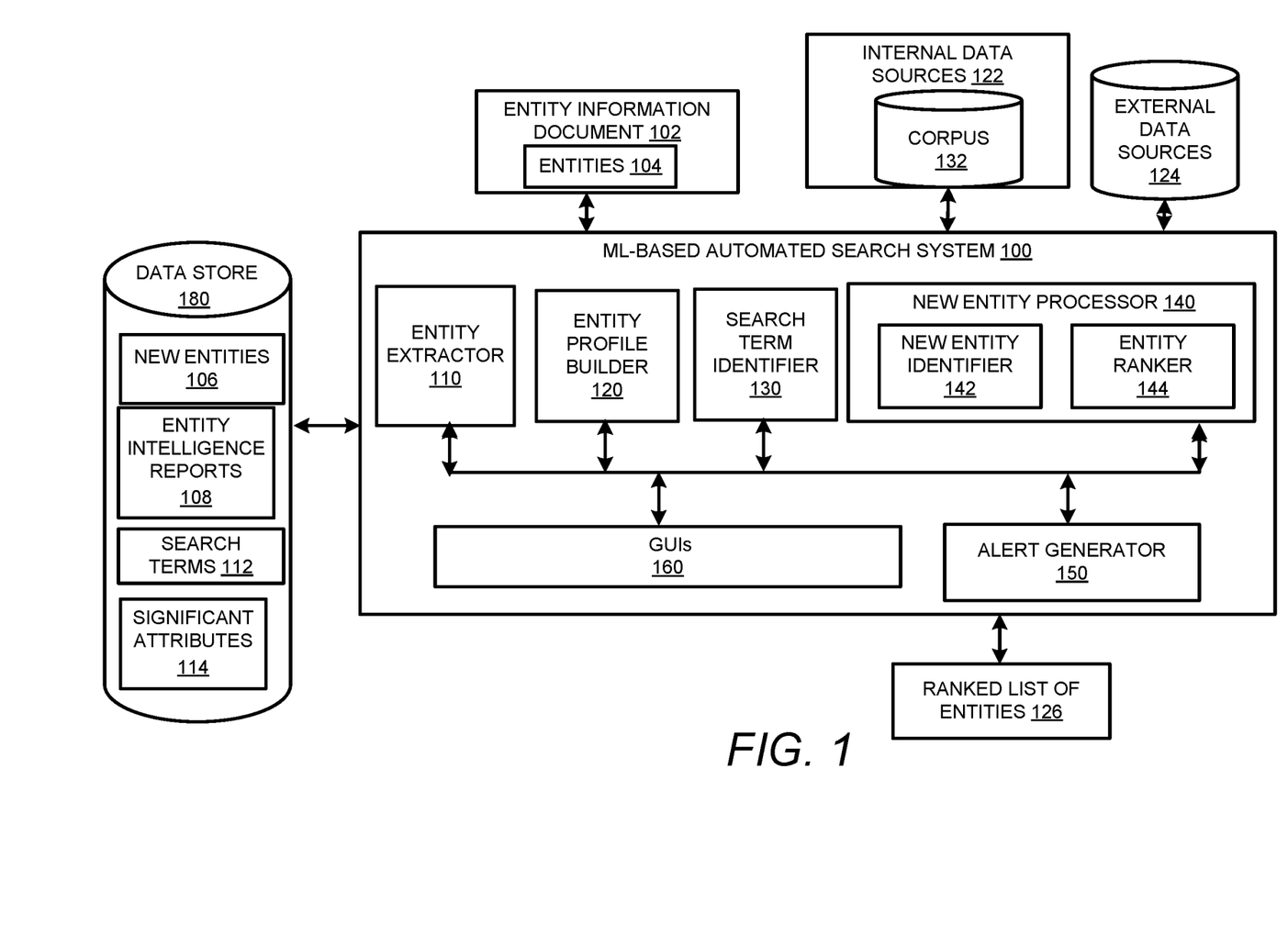
FIG. 1 is a block diagram that shows an ML-based automated search system in accordance with the examples disclosed herein.

FIG. 1 is a block diagram that shows the ML-based automated search system 100 in accordance with examples disclosed herein. The automated search system 100 can include processors and data store(s) 180 with instructions and other elements that enable the automated search system 100 to receive an entity information document 102 that includes data entries related to a plurality of entities 104 and employs the data from the entity information document 102 to discover search terms and execute automatic searches for additional new entities 106 that are not included in the entity information document 102 and generate a ranked list of the new entities 126. The automated search system 100 includes an entity extractor 110, an entity profile builder 120, a search term identifier 130 and a new entity processor 140 in accordance with an example. In addition, various GUIs 160 are also included within the automated search system 100 for inputting information and receiving output therefrom.

The entity information document 102 can be received in various document formats such as but not limited to, spreadsheets, comma separated values (CSV) files, image files, email files and the like. In an example, the entity information document 102 can include transaction data pertaining to transactions in a target category. Therefore, the plurality of entities 104 and the new entities 106 also belong to the target category. In an example, the target category can pertain to a specific manufacturing or service provider such as a cell phone manufacturer and the entities 104 can include brand names such as Apple, Samsung, Google Pixel and the like. Based on such entities included in the entity information document 102, the automated search system 100 can discover other cell phone manufactures.

The entity extractor 110 receives the entity information document 102, extracts the plurality of entities 104 by employing textual and natural language processing techniques on the entity information document 102. The entities 104 thus recognized from the entity information document 102 are employed by the entity profile builder 120 to build entity intelligence reports 108 for each of the entities 104. The entity intelligence reports 108 can include information or metadata regarding the entities 104 that is obtained from internal and the external data sources 124. The internal data sources 122 can include data sources of various systems within an organization such as archives of various reports that were previously generated, transaction logs and the like. The external data sources 124 can include publicly available data sources such as those on the internet in a general purpose search engine etc. For example, if the entity intelligence reports 108 pertain to a particular brand, the metadata in the entity intelligence reports 108 can include but is not limited to, corporate address or retail locations, description of the brand products or the brand itself, financials, team members involved in managing the brand etc.

The search term identifier 130 accesses the entity intelligence reports 108 and identifies search terms 112 to execute a search for the new entities. In an example, the descriptive portions of the entity intelligence reports 108 are analyzed to identify keywords so that each entity is described by a particular set of keywords. An intersection of the set of keywords or commonly occurring keywords from the entity intelligence reports 108 can be identified as search terms 112 to be used in searching for the new entities.

The search terms 112 can then be employed by the new entity processor 140 or more particularly by the new entity identifier 142 to automatically execute searches on the general purpose search engines such as GOOGLE, BING, etc. The documents retrieved from the searches are stored to a corpus 132. The information thus stored in the corpus 132 is again processed for recognizing occurrence of one or more of the plurality of entities and other newer entities that are not included in the entity information document 102. In an example, the formatting structures associated with the occurrences of the entities such as lists, tables etc. can be further analyzed to identify the newer entities. The data structures such as sentences, paragraphs etc. wherein the occurrences of the entities are identified such as product/service reviews, comments etc. can also be analyzed for the identification of newer entities. Trained ML models can be used for the identification of the formatting and the data structures. Furthermore, one or more of textual processing and NLP techniques are used to parse, tokenize and tag the relevant portions within the corpus 132. The resulting tokens can be compared using the textual processing techniques with the entity information in the entity information document 102. New entities that were retrieved from the automatically executed searches can be identified based on the comparisons. In an example, the new entity identifier 142 can employ trained ML models for determining structures that include occurrences of the entities The new entities 106 thus identified can be further processed for ranking by the entity ranker 144. In an example, the entity ranker 144 can be configured to rank the new entities 106 based on significant attributes 114 or significant metadata. The significance of the various attributes is initially estimated by comparing the attributes of the new entities 106 with the plurality of entities 104. Attributes having greater similarity between the entities 104 and the new entities 106 are assigned higher significance. The significant attributes thus determined are used to rank the new entities. The ranked list of entities 126 is thus output by the automated search system 100. In an example, the ranked list of entities 126 can be further processed by an alert generator 150 so that alerts regarding the new entities 106 can be transmitted to the users who are registered with the automated search system 100. The alert including the ranked list of entities 126 can be transmitted via an email in an example.

Figure 2:
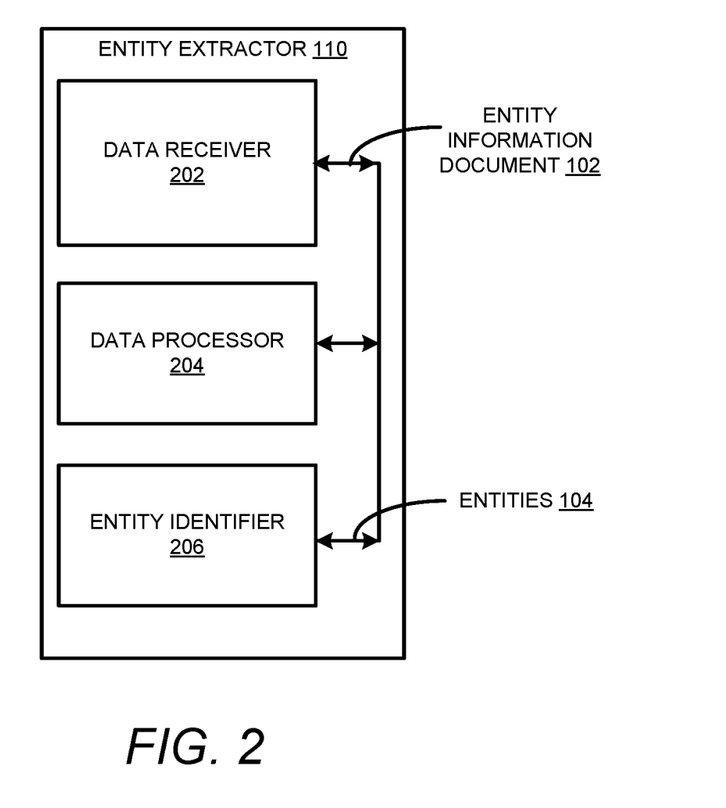
FIG. 2 shows a block diagram of an entity extractor in accordance with the examples disclosed herein.

FIG. 2 shows a block diagram of the entity extractor 110 in accordance with the examples disclosed herein. The entity extractor includes a data receiver 202, a data processor 204 and an entity identifier 206. The data receiver 202 receives the entity information document 102. As mentioned herein, the entity information document 102 can be of different formats which can include processor-readable formats such as spreadsheets or word processor documents or the entity information document 102 can have an image format. Based on the format of the entity information document 102, the data processor 204 can apply the corresponding processing techniques to extract the data therefrom. If the entity information document 102 is of a processor-readable format such as spreadsheets etc., then simple text matching techniques using entities already associated with the target domain can be applied to obtain the data. If the entity information document 102 is not of processor readable format e.g., scanned image format, image processing techniques can be used to identify the textual data.

The textual data obtained by the data processor 204 from the entity information document 102 can be received by the entity identifier 206 for identification of the entities 104. The entity identifier 206 can include ML elements such as classifiers which are trained to identify specific entity identifying indicia such as entity names, particular symbols etc. For example, referring back to the cell phone manufacturers, the ML elements can be trained to recognize names such as Samsung or stock market symbols like AAPL as referring to particular entities from the target category. In another example, the entity identifier 206 can have access to a list of entities and corresponding identifying indicia in the target category in a spreadsheet, database file etc. and text matching techniques can be employed in identifying the entities in the entity information document 102.

Figure 3:
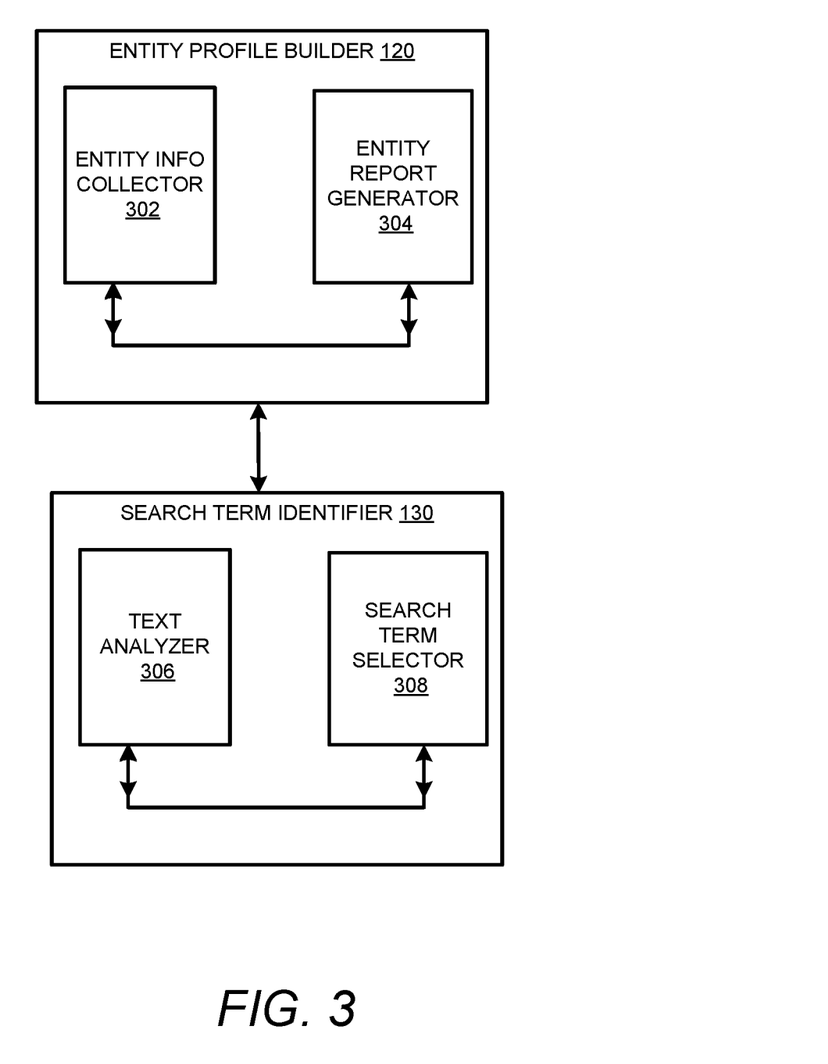
FIG. 3 shows a block diagram of an entity profile builder and a search term identifier in accordance with the examples disclosed herein.

FIG. 3 shows a block diagram of the entity profile builder 120 and the search term identifier 130 in accordance with the examples disclosed herein. The entity profile builder 120 includes an entity info collector 302 and an entity report generator 304. The entities 104 from the entity extractor 110 can be received by the entity info collector 302 which can be configured to execute automatic searches on the external data sources 122 and the internal data sources 122 for information. In an example, the external data sources 124 can include the internet. Publicly available sources as well as subscription based websites and the like can be employed to obtain the information regarding the entities 104. The information thus obtained can be aggregated by the entity report generator 304. In an example, the required information can be obtained by the entity info collector 302 at one source in which case, the report from that source can be supplied by the entity report generator 304 as the entity intelligence reports 108.

The search term identifier 130 access the entity intelligence reports 108 to obtain the search terms 112 corresponding to one or more of the entities and the target category. The search term identifier 130 includes a text analyzer 306 that analyzes the descriptive portions of the entity intelligence reports 108 to identify keywords. The fields that can be identified from the descriptive portions for a particular target category can include but are not limited to, locations, types of services provided or the types of products manufactured, financials and the like. The search term selector 308 further obtains the various keywords extracted by the text analyzer 306 to select as the search terms 112, keywords that occur commonly in various ones of the entity intelligence reports 108.

Figure 4:
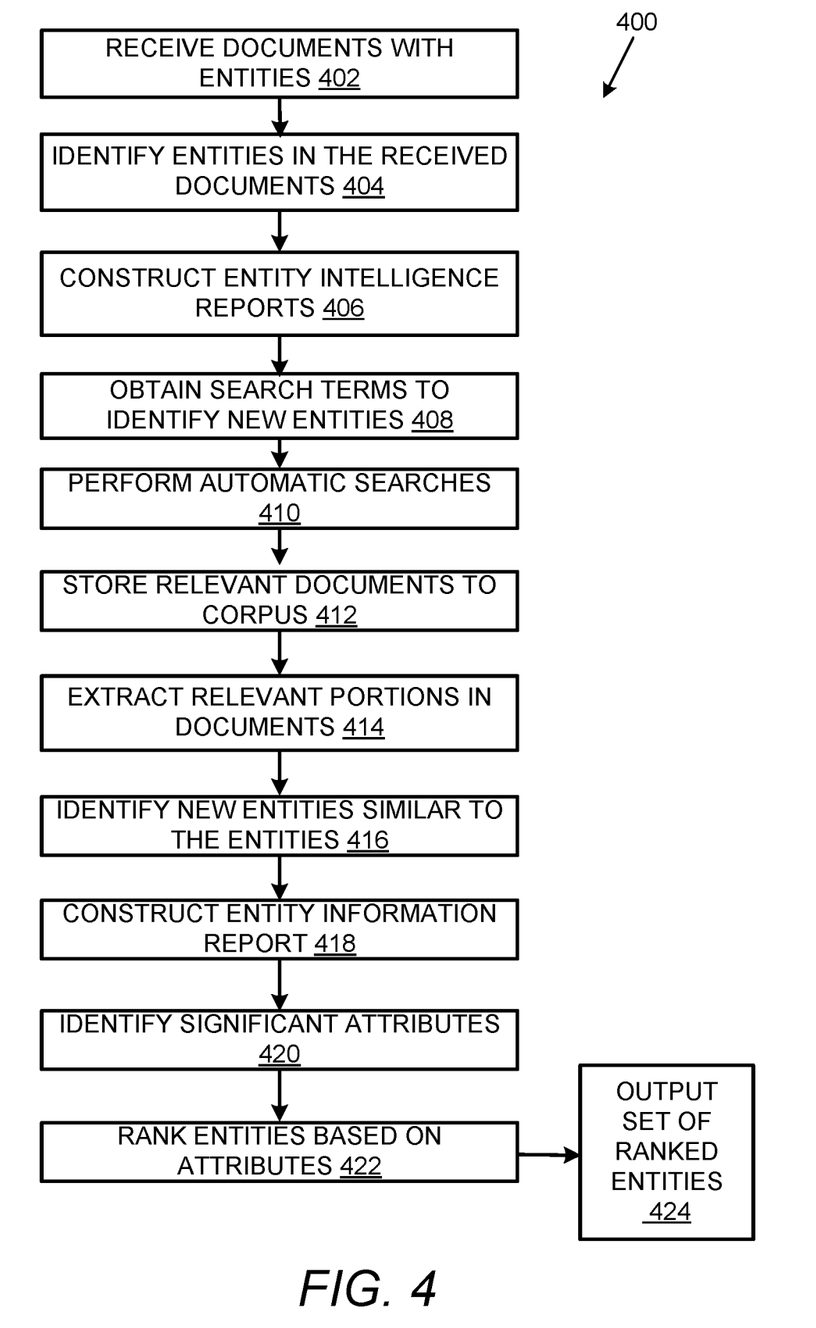
FIG. 4 shows a flowchart that details a method of executing automatic searches to generate a ranked list of entities in accordance with the examples disclosed herein.

FIG. 4 shows a flowchart 400 that details a method of executing automatic searches to generate a ranked list of entities in accordance with the examples disclosed herein. The method begins at 402 wherein the entity information document 102 including the plurality of entities 104 is received. In an example, the entity information document 102 can include transaction data that specifies names of companies (i.e., the entities) involved in the transactions. At 404, the entities within the entity information document 102 are identified. Based on the total number of entities identified, a subset of the entities including the top n entities (n being a natural number and n=1, 2, . . . ) of the entities in the entity information document 102 can be selected at 404. In an example, the entities can be ranked based on certain predetermined attributes. In an example, the entities can be ranked on common attributes that were previously discovered in accordance with the implementations disclosed herein. The entity intelligence reports 108 are constructed for each of the entities 104 at 406 by obtaining the necessary information via automatically executed searches that employ the entity names or other entity identifying indicia as keywords. Data such as but not limited to, entity description, headquarters, financials etc. can be included in the entity intelligence reports 108.

The search terms 112 for executing automatic searches to identify the new entities 106 are obtained at 408. Particular keywords can be retrieved based on the target category. As mentioned above, various keywords related to the locations of the entities, are identified from the descriptive portions of the retrieved information. Referring to the example of the phone manufacturers, the keywords can include the descriptive terms of the various phones that are produced by the phone manufacturer as gathered from the product manuals, reviews of the products, users' reviews and the like. In an example, domain specific websites that provide information regarding various products pertaining to a specific domain can be used to obtain the information from which the keywords are extracted.

The automatic searches are executed at 410 with the search terms 112, using for example, general purpose search engines. The documents retrieved by the search engines are stored to the corpus 132 at 412. In an example, certain relevant portions of the documents retrieved from the search engines are extracted at 414. Again NLP/text processing techniques can be employed to extract the relevant portions. The relevant, extracted portions of the documents in the corpus are again analyzed in accordance with the methodologies disclosed herein to identify at 416, a set of new entities R which are similar to the entities 104 which were included in the entity information document 102. In an example, the set of new, similar entities can be entities that correspond to the same target category as the entities 104 in the entity information document 102. At 418, entity intelligence reports are obtained for each of the new entities in the set of new entities R in accordance with the methods disclosed herein. At 420, the important or significant attributes of the entities (including the entities 104 and the set of new entities discovered at 414) are determined. The set of new entities are ranked at 422 based on the determined significant attributes and the top x (x being a natural number and x=1, 2 . . . ) new entities of the set of new entities are output at 424 and can be employed for alert generation.

Figure 5:
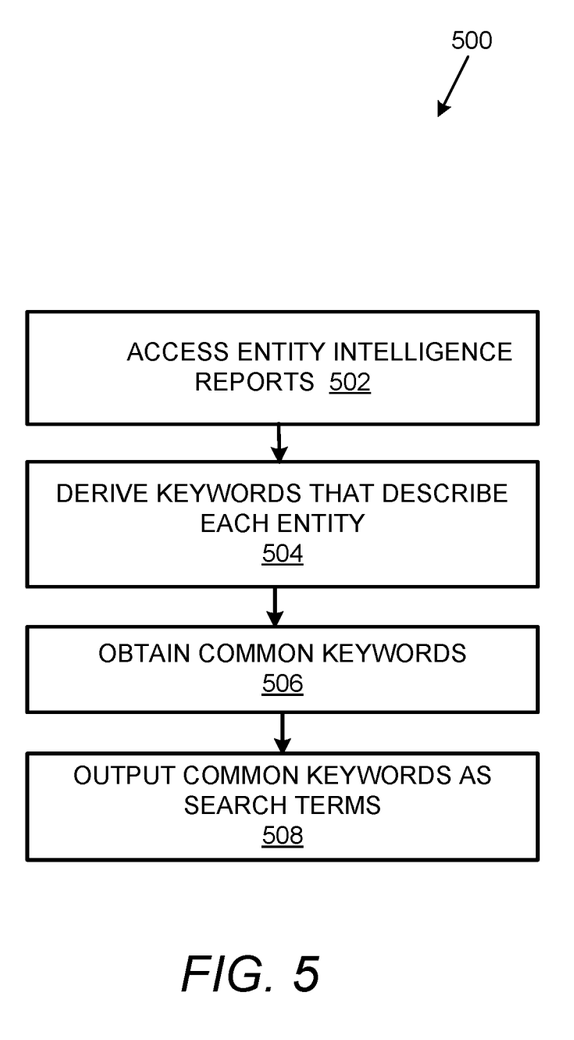
FIG. 5 shows a flowchart that details a method of identifying search terms from entity intelligence reports in accordance with the examples disclosed herein.

FIG. 5 shows a flowchart 500 that details a method of identifying search terms from in the entity intelligence reports 108 in accordance with the examples disclosed herein. At 502, the entity intelligence reports 108 of the entities 104 are accessed. The respective entity intelligence report of each of the entities can include various terms which describe the entity. Keywords about the entity's locations, types of services provided, the goods or products which are manufactured etc. can be included in the entity intelligence reports. Accordingly, respective sets of keywords that describe each of the entities 104 are derived at 504 from the respective entity intelligence report. Textual and natural language processing techniques such as parsing, tokenization, parts of speech (POS) tagging and particular ML-based data models to identify specific domain based terminologies can be employed at 504 for deriving the sets of keywords. By the way of illustration and not limitation, three set of keywords for each of three different entities belonging to a target category of smartphone manufacturers are shown below:

Apple=>{smartphone, iOS, iPad, iPhone, tablet}
Samsung=>{smartphone, Android, Galaxy, tablet}
Huawei=>{smartphone, P20, EMUI, tablet}

At 506, the common keywords from the various sets of keywords corresponding to the different entities are obtained. Referring to the example above, common keywords 'smartphone' and 'tablet' which occur in all the three sets can be selected as the common keywords. At 508, the common keywords are output as the search terms 112 to be used in automatic searches. In an example, the target category can also be employed as a search term so that in the above example, the search terms 112 can include "smartphone manufacturer' and/or 'tablet manufacturer'.

Figure 6:
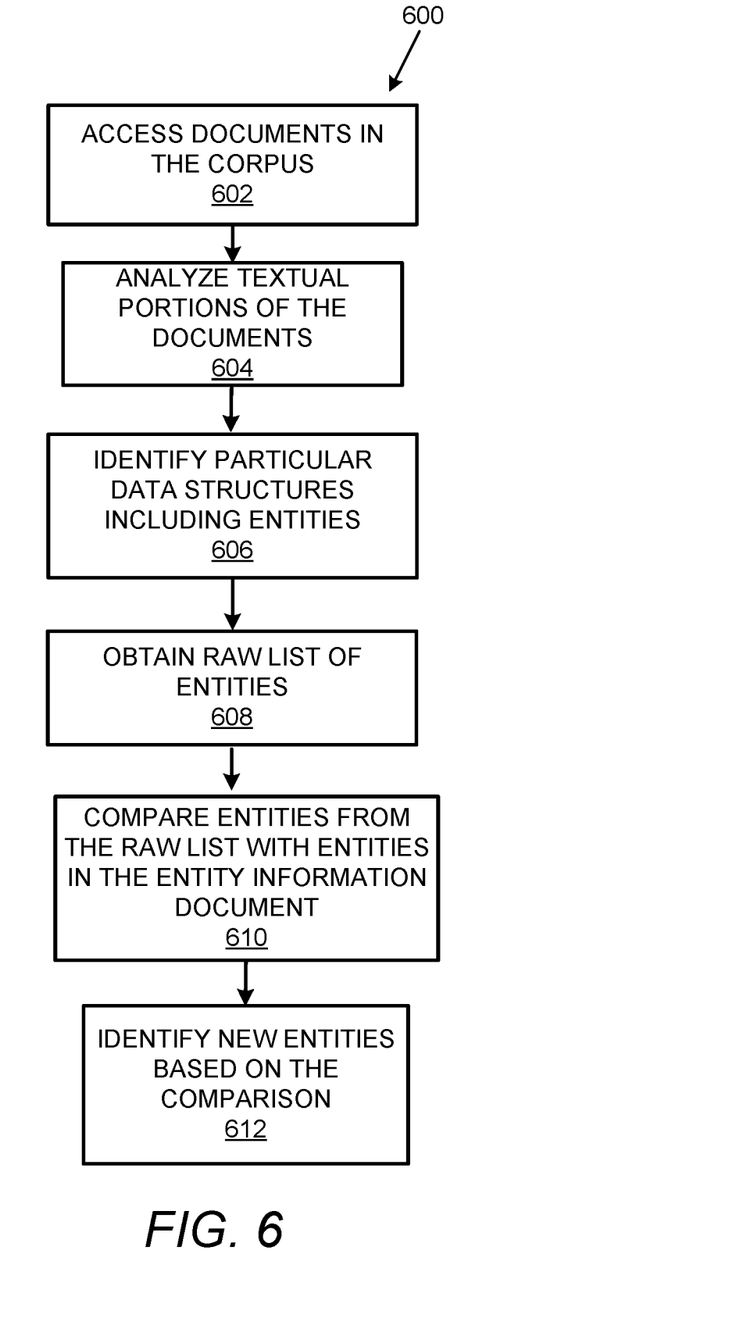
FIG. 6 shows a flowchart that details a method of identifying new entities from in the documents in a corpus in accordance with the examples disclosed herein.

FIG. 6 shows a flowchart 600 that details a method of identifying new entities from in the documents in the corpus 132 in accordance with the examples disclosed herein. The method begins at 602 wherein the documents in the corpus 132 that were collected using the search terms 112 are accessed. At 604, the relevant portions which can include one or more of textual portions or graphics of the documents in the corpus 132 are analyzed to identify those portions that contain the entities 104 included in the entity information document 102. For example, if the entity information document 102 contains Subsea7, Oceaneering, DNV-GL then the relevant portions from the corpus 132 can be checked and text containing "Ophir, Oceaneering, Subsea UK, DOF Subsea . . . " etc. can be identified from the corpus 132 at 604.

At 606, the particular data structures that include the entities 104 are also identified as, certain data structures such as the HTML lists can be indicative of occurrence of multiple entities. For example, textual data structures such as sentences, paragraphs, or other formatted structures such as HTML lists containing any of the entities can be identified at 606. Again, by the way of illustration and not limitation, HTML lists containing any of the entities e.g., Fortuna LNG, One Subsea, Motive Offshore etc. can be identified at 606.

At 608, a raw list of entities can be obtained. In an example, the raw list of entities can include the entities 104 from the entity information document 102 and the new entities from a set of new entities which are identified from the relevant portions of the documents in the corpus 132 but which were not included in the entity information document 102. Referring to the example above, a raw list of entities can include, Ophir, Subsea UK, DOF Subsea, Fortuna LNG, One Subsea, Motive Offshore etc. can be obtained at 608. In an example, domain names corresponding to the raw lists can be identified via further searches based on the entity names included in the raw list to generate the entity intelligence reports 108 for the entities which are identified using the textual portions of the documents in the corpus but which were not included in the entity information document 102. At 610, the entities in the raw list of entities can be compared with the plurality of entities 104 that were included in the entity information document 102. For example, one or more of textual processing techniques or NLP techniques can be used for the comparisons. At 612, those entities from the raw list that were not included in the entity information document 102 can be identified as the new entities.

Figure 7:
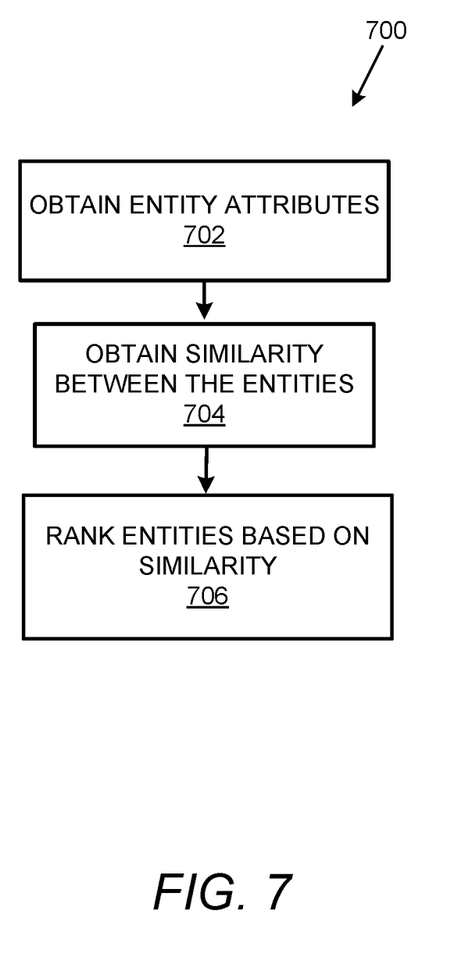
FIG. 7 shows a flowchart that details a method of identifying significant attributes for ranking the entities in accordance with the examples disclosed herein.

FIG. 7 shows a flowchart 700 that details a method of identifying significant attributes for ranking the entities in accordance with the examples disclosed herein. It can be appreciated that given a set of entities attributes showing little variation or diversity across the entities of the set hold the set together. For example, if all suppliers of a target categories are located within a zip code 085xx in the United States then such a feature holds the entities of the set together. On the other hand, if some entity has a revenue of $5-10 M and another entity has a revenue off around $40-50 M, the revenue cannot be identified as the attribute that holds the set of entities together. Such variation can be captured via entropy calculations. Alternately, the attributes can be features of the entities that cause the entities to be grouped together or caused the entities to co-occur in the documents of the corpus 132.

At 702, the attributes of the entities identified from the documents in the corpus 132 are obtained. In an example, the entity ranker 144 can be preconfigured to access particular attributes for a specific target category. At 704 the similarity between each of the entities 104 and each of the newer entities which were not included in the entity information document 102 but were identified from the automatic search is determined. Various similarity measures such as cosine similarity measure, GINI coefficient, the inverse of the variance and the like can be employed for the similarity calculations. The similarity of corresponding attribute values between an entity from the entity information document 102 and an entity from the set of new entities can be obtained as:

$$\text{Similarity}(r,s) = \Sigma i \; wi^* \text{similarity}(ri, si)$$

where ri and si are i-th features of entities r and s, respectively, and wi is the entropy of i-th feature. The entities from the set of new entities with high average similarity with the entities 104 are ranked higher at 706 when generating the ranked list of entities.

Figure 8A:
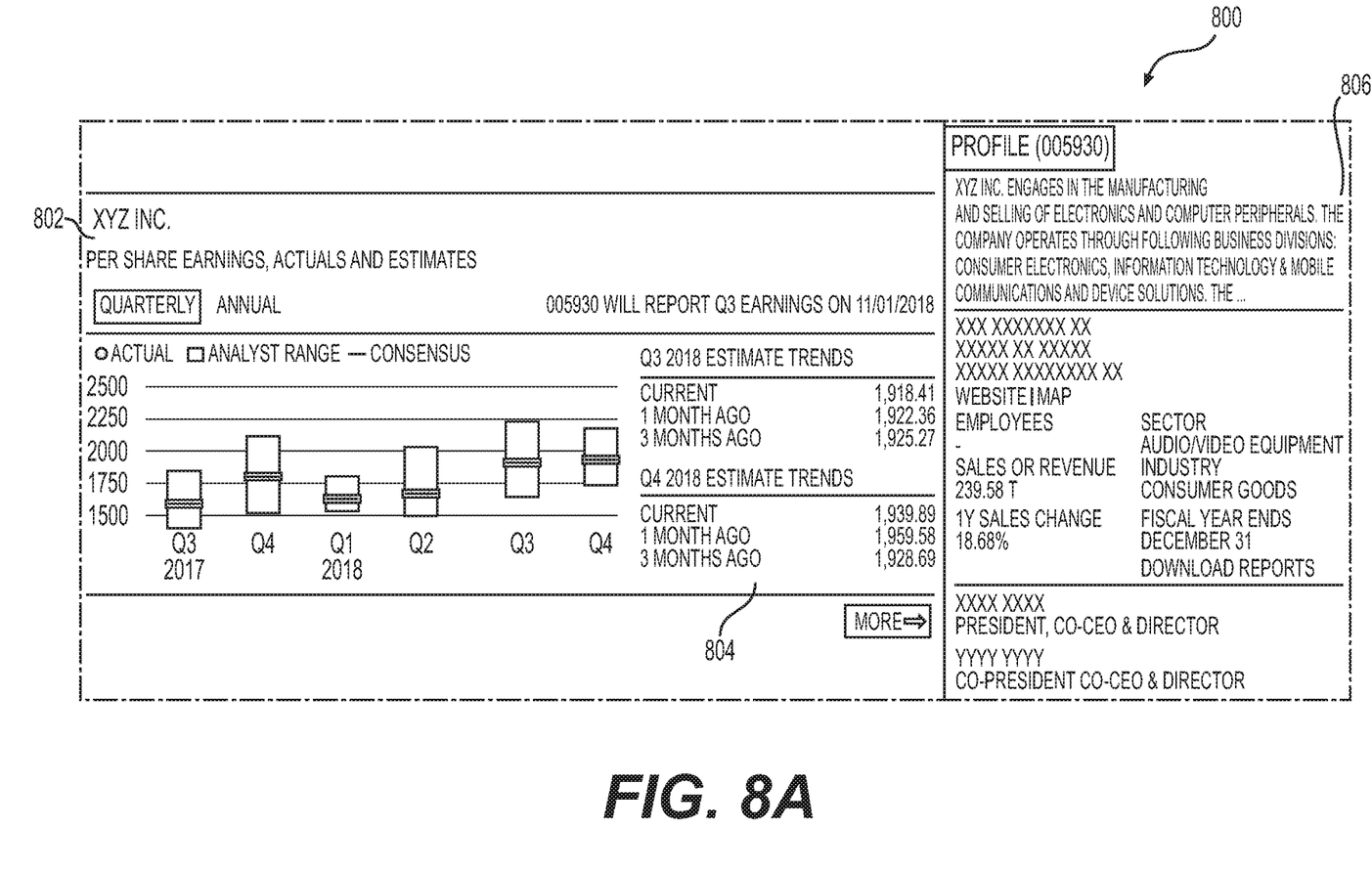
FIG. 8A shows an entity intelligence report generated in accordance with the examples disclosed herein.

FIG. 8A shows an example entity intelligence report 800 generated in accordance with the examples disclosed herein. Details regarding the entity 802 'XYZ Inc.' are discussed in the entity intelligence report 800. The details can include the financial details 804, a description 806 regarding the products and services of XYZ Inc. and the like.

Figure 8B:
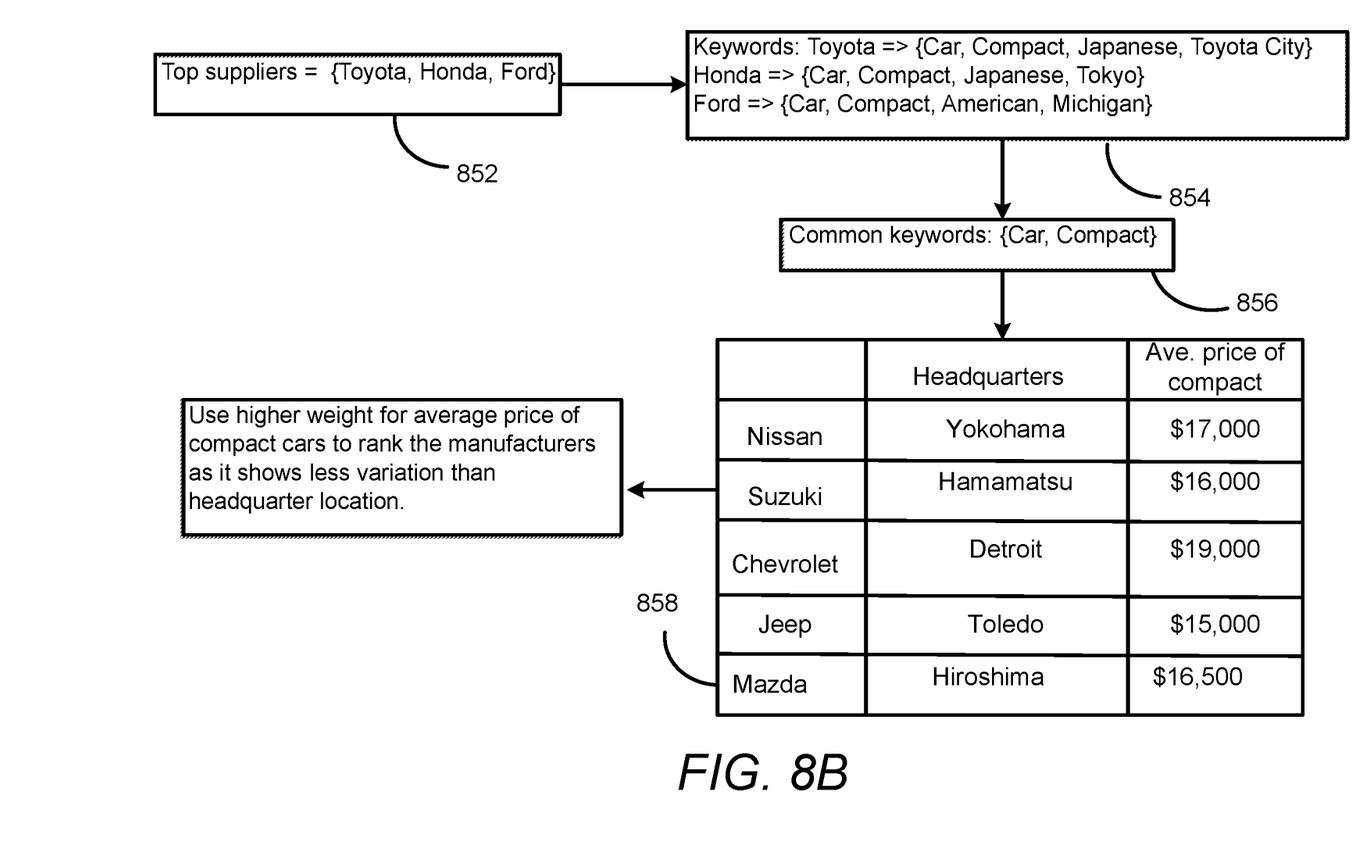
FIG. 8B shows an implementation wherein the automated search system is used to rank car manufacturers in accordance with the examples disclosed herein.

FIG. 8B shows an implementation wherein the automated search system 100 is used to rank car manufacturers in accordance with the examples disclosed herein. Initially, the top suppliers 852 namely, Toyota, Honda and Ford are received via the entity information document 102 which may include the supplier names or other identifying indicia of the suppliers. The keywords 854 associated with each of the top suppliers are derived and the common keywords 856 of car and compact are identified at 856. Supplier intelligence reports are generated for each of Toyota, Honda and Ford which can spawn further searches which provide new suppliers including Chevrolet, Jeep and Mazda as shown at the table 858. Moreover, attributes or metadata of the entities estimated for similarity include the headquarters and average price of a compact car for each of the suppliers including the top suppliers that were originally received as well as the newly discovered suppliers. As seen from the table 858, the average price of a compact car shows less variation or has greater similarity than the headquarters attribute. Therefore, the average price of a compact car is employed for ranking the suppliers as opposed to headquarters attribute.

Figure 9:
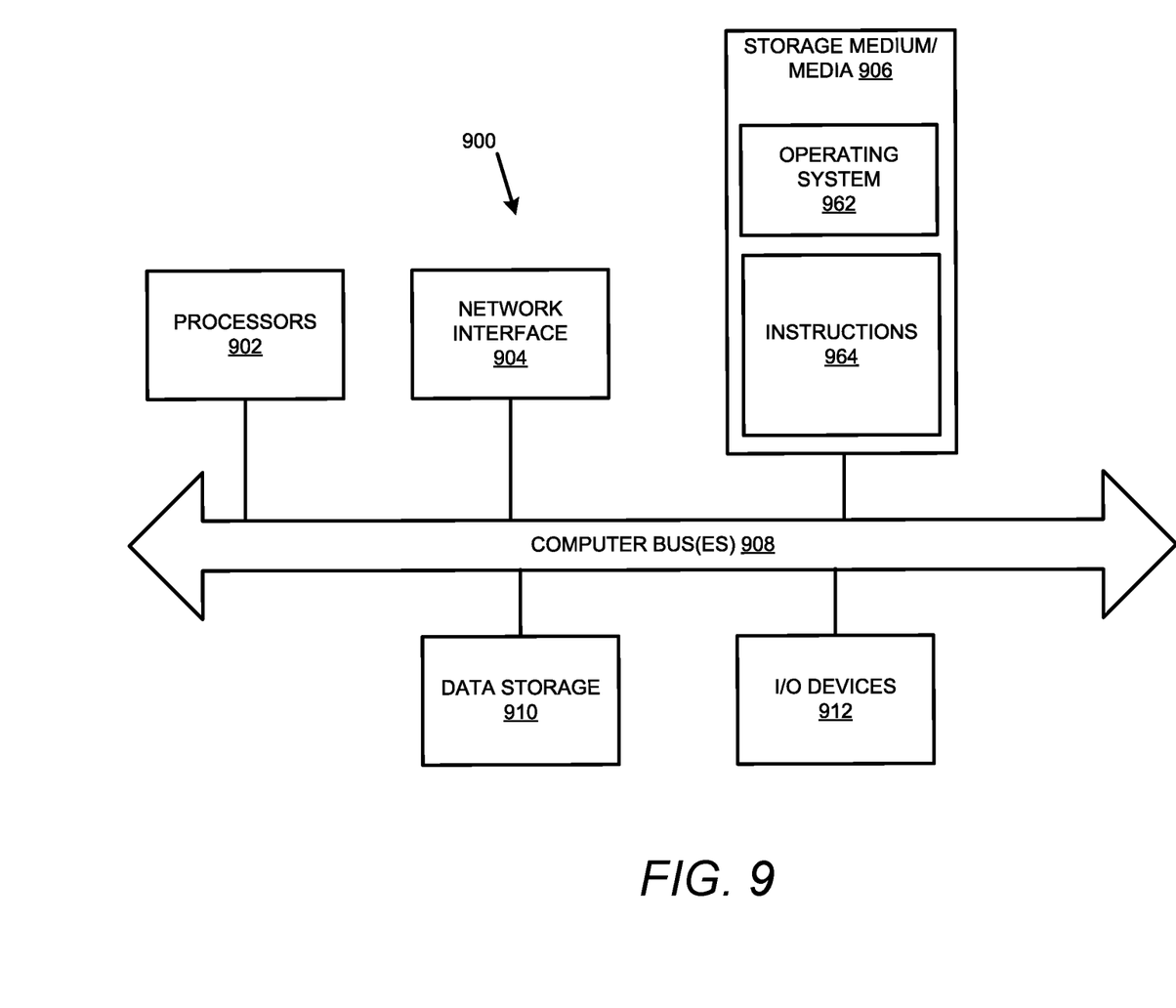
FIG. 9 illustrates a computer system that may be used to implement the automated search system in accordance with examples disclosed herein.

FIG. 9 illustrates a computer system 900 that may be used to implement the automated search system 100. More particularly, computing machines such as desktops, laptops, smartphones, tablets and wearables which may be used to generate or access the data from the automated search system 100 may have the structure of the computer system 900. The computer system 900 may include additional components not shown and that some of the components described may be removed and/or modified. In another example, a computer system 900 can sit on external-cloud platforms such as, Amazon Web Services, AZURE cloud or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the automated search system 100.

The automated search system 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the automated search system 100. The operating system 962 may be multi-user, multiprocessing, multitasking, multithreading, real-time and the like. For example, during runtime, the operating system 962 is running and the code for the automated search system 100 is executed by the processor(s) 902.

The computer system 900 may include a data storage 910, which may include non-volatile data storage. The data storage 910 stores any data used by the automated search system 100. The data storage 910 may be used to store the entity information document 102, the entities 104, the new entities 106, the entity intelligence reports 108 and the like.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A machine learning (ML) based automated search system comprising:
at least one processor;
a non-transitory processor readable medium storing machine-readable instructions that cause the at least one processor to:
receive an entity information document that includes data entries related to a plurality of entities that belong to a target category;
identify information regarding the plurality of entities available within internal and external data sources associated with the automated search system;
construct an entity intelligence report for each of the plurality of entities, the entity intelligence report including metadata regarding the plurality of entities being predetermined based on the target category and the metadata being obtained from the internal and the external data sources;
discover search terms associated with the plurality of entities from the entity intelligence reports;
obtain documents to generate a corpus by automatically executing searches on a general purpose search engine using the search terms;
extract information related to new entities by analyzing the documents from the corpus, the new entities being different from the plurality of entities and the new entities not included in the entity information document;
compute similarity between attribute values of each attribute of a plurality of attributes of the plurality of entities and attribute values of a corresponding attribute of the new entities;
identify at least one attribute of the plurality of attributes having greater similarity among the attribute values of the entities and the new entities;
rank the new entities based on the similarities of the attribute values of the corresponding attribute of each of the new entities with the attribute values of the entities associated with the at least one attribute; and
output a ranked list of the new entities.

2. The automated search system of claim 1, wherein the instructions to identify the information regarding the entities available within the internal and external data sources further comprise instructions that cause the processor to:
    execute web searches by employing the plurality of entities as search terms on [a] the general purpose search engine.

3. The automated search system of claim 2, wherein the instructions to identify the information regarding the plurality of entities available within the internal and external data sources further comprise instructions that cause the processor to:
    identify websites having information pertaining to the plurality of entities; and
    extract the information regarding the plurality of entities from the websites.

4. The automated search system of claim 3, wherein the instructions to identify the information regarding the plurality of entities available within the internal and external data sources further comprise instructions that cause the processor to:
    extract the metadata regarding the plurality of entities from the internal and external data sources using trained ML models.

5. The automated search system of claim 1, wherein the instructions to discover search terms associated with the entities from the entity intelligence reports further comprise instructions that cause the processor to:
    identify keywords associated with the metadata regarding each of the plurality of entities.

6. The automated search system of claim 5, wherein the instructions to discover the search terms associated with the plurality of entities from the entity intelligence reports further comprise instructions that cause the processor to:
    select a subset of the keywords that are common to at least two of the plurality of entities as the search terms.

7. The automated search system of claim 1, wherein the instructions to extract information related to new entities from the documents in the corpus further comprise instructions that cause the processor to:
    employ text matching techniques for identifying occurrences of the plurality of entities in the documents; and
    employ trained Machine Learning (ML) models for determining structures that include the occurrences of the plurality of entities.

8. The automated search system of claim 7, wherein the instructions to determine structures that include the occurrences of the plurality of entities further comprise instructions that cause the processor to:
    determine, using the trained ML models, sentences that pertain to comments regarding the plurality of entities.

9. The automated search system of claim 8, wherein the instructions to extract information related to new entities from the documents in the corpus further comprise instructions that cause the processor to:
    compare different entities in the sentences with the plurality of entities in the entity information document, the comparison being executed with text matching techniques; and
    identify additional entities in the sentences that are not included in the plurality of entities from the entity information document as the new entities.

10. The automated search system of claim 7, wherein the instructions to determine structures that include the occurrences of the plurality of entities further comprise instructions that cause the processor to:
    determine, using the trained ML models, Hypertext Markup Language (HTML) lists that including the plurality of entities.

11. The automated search system of claim 10, wherein the instructions to extract information related to new entities from the documents in the corpus further comprise instructions that cause the processor to:
    compare the entities in the HTML lists with the plurality of entities in the entity information document, the comparison being executed with text matching techniques; and
    identify additional entities that occur in the Hypertext Markup Language (HTML) lists with one or more of the plurality of entities as the new entities.

12. The automated search system of claim 1, wherein the plurality of entities pertain to suppliers in the target category.

13. A processor-executable method for identifying new entities comprising:
    receiving a supplier information document including identifying indicia of a plurality of suppliers for a target category;
    identifying information regarding the plurality of suppliers available within internal and external data sources;
    generating supplier intelligence reports based on the identifying indicia from the supplier information document, the supplier intelligence reports including metadata regarding the plurality of suppliers, the metadata being predetermined based on the target category and the metadata being obtained from the internal and external data sources;
    obtaining keywords describing each of the plurality of suppliers from the supplier intelligence reports;
    executing automated searches on a general purpose search engine by employing keywords that occur commonly between the supplier intelligence reports of the plurality of suppliers as search terms;
    generating a corpus by storing results from the automated searches to the corpus;
    extracting relevant portions of the results obtained in response to the automated searches;
    analyzing the relevant portions of the results for co-occurrence of new suppliers with one or more of the plurality of suppliers, wherein the new suppliers are not included in the supplier intelligence reports;
    obtaining attributes of each of the plurality of suppliers and each of the new suppliers, wherein the attributes are predetermined based on the target category;
    compute similarity between attribute values of each attribute of a plurality of attributes of the plurality of suppliers and attribute values of a corresponding attribute of the new suppliers;
    estimating significance of the attributes of the plurality of suppliers and each of the new suppliers based on similarities between the attribute values of the plurality of suppliers and attribute values of the new suppliers, wherein higher significance is assigned to at least one attribute compared to other attributes of the plurality of attributes; and
    ranking the new suppliers based on the similarities between the attribute values of the plurality of suppliers and the attribute values of the new suppliers for the at least one attribute having the higher significance.

14. The method of claim 13, wherein the supplier information document includes transaction data.

15. The method of claim 13, wherein generating supplier intelligence reports further comprises:
    crawling websites of the plurality of suppliers for metadata to be included in the supplier intelligence reports.

16. The method of claim 13, further comprising:
transmitting an alert to registered users, the alert including a ranked list of the new suppliers.

17. A non-transitory computer-readable storage medium comprising machine-readable instructions that cause a processor to:
receive an entity information document that includes data entries related to a plurality of entities that belong to a target category;
identify information regarding the plurality of entities available within a plurality of data sources including internal and external data sources;
construct an entity intelligence report for each of the plurality of entities, the entity intelligence report including metadata regarding the plurality of entities, the metadata being predetermined based on the target category and the metadata being obtained from the internal and the external data sources;
discover search terms associated with the entities from the entity intelligence reports;
obtain documents to generate a corpus by automatically executing searches on a general purpose search engine using the search terms;
extract information related to new entities by analyzing the documents from the corpus, the new entities being different from the entities and the new entities not included in the entity information document;
compute similarity between attribute values of each attribute of a plurality of attributes of the plurality of entities and attribute values of a corresponding attribute of the new entities;
identify at least one attribute of the plurality of attributes having greater similarity among the attribute values of the entities and the new entities;
assign higher significance to the at least one attribute as compared to other attributes of the plurality of attributes; and
rank the new entities based on similarity of the attribute values of the corresponding attribute of each of the new entities with the attribute values of the entities associated with the at least one attribute; and
output a ranked list of the new entities.

18. The non-transitory computer-readable storage medium of claim 17, wherein the instructions to compute similarity further comprising instructions that cause the processor to:
compute the similarity via cosine similarity measure.

19. The non-transitory computer-readable storage medium of claim 18, wherein the instructions to compute discover search terms associated with the entities from the entity intelligence reports further comprise instructions that cause the processor to:
identify keywords associated with the metadata regarding each of the plurality of entities.

* * * * *

UNITED STATES PATENT AND TRADEMARK OFFICE
CERTIFICATE OF CORRECTION

PATENT NO. : 11,328,005 B2
APPLICATION NO. : 16/204780
DATED : May 10, 2022
INVENTOR(S) : Krishna Kummamuru et al.

It is certified that error appears in the above-identified patent and that said Letters Patent is hereby corrected as shown below:

In the Claims

At Claim 2, Column 11, Line 4 from the top, the phrase "on [a] the general" should instead read "on the general"

Signed and Sealed this
Seventh Day of February, 2023

Katherine Kelly Vidal
*Director of the United States Patent and Trademark Office*